United States Patent
Chan et al.

(10) Patent No.: US 8,138,716 B1
(45) Date of Patent: Mar. 20, 2012

(54) PORTABLE MULTI-INPUT REMOTE AA BATTERY CHARGERS

(75) Inventors: Yuk Chan, Middletown, DE (US); Arek Suszko, Rincon, PR (US); Terrill B. Atwater, North Plainfield, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 433 days.

(21) Appl. No.: 12/462,940

(22) Filed: Aug. 6, 2009

(51) Int. Cl.
*H02J 7/00* (2006.01)

(52) U.S. Cl. .................................. 320/107; 320/110

(58) Field of Classification Search .............. 320/107, 320/110
See application file for complete search history.

(56) References Cited

U.S. PATENT DOCUMENTS

| | | | | |
|---|---|---|---|---|
| 6,876,172 B2* | 4/2005 | Lam et al. | | 320/110 |
| 7,816,886 B2* | 10/2010 | Brandon et al. | | 320/110 |
| 8,026,698 B2* | 9/2011 | Scheucher | | 320/136 |
| 2006/0170393 A1* | 8/2006 | Yang | | 320/107 |
| 2007/0159132 A1* | 7/2007 | Wu et al. | | 320/104 |

* cited by examiner

*Primary Examiner* — M'Baye Diao
(74) *Attorney, Agent, or Firm* — Michael Zelenka; Stephen J. Harbulak

(57) ABSTRACT

A portable multi-input remote AA battery charger is provided that can recharge as many as eight (8) AA batteries at once within 100 minutes. This invention's battery charger for rechargeable batteries can also be powered by a number of the currently available military batteries such as the BA-8180, BA-8140, BA-5590, BA-5390, BB-390, BB-2590, and SP4 batteries. The portable multi-input remote AA battery charger includes at least two (2) battery chambers, slots for the AA batteries, a charging circuit, a housing, and a connector. A portable multi-input remote AA battery charger apparatus and a method for charging AA rechargeable batteries with a portable battery charger are also provided.

18 Claims, 4 Drawing Sheets

PORTABLE MULTI-INPUT REMOTE AA BATTERY CHARGERS

GOVERNMENT INTEREST

The invention described herein may be manufactured, used, imported, sold, and licensed by or for the Government of the United States of America without the payment to us of any royalty thereon.

FIELD OF THE INVENTION

The present invention relates generally to the field of battery charging devices and apparatus. More particularly, the present invention relates to a portable multi-input AA battery charger.

BACKGROUND OF THE INVENTION

Each year millions of dollars are spent on rechargeable batteries for use in portable electronics equipment. Due to their low life-cycle costs, rechargeable batteries are the power source of choice for numerous equipment applications, both civilian and military. There is currently no convenient and cost-effective way for recharging such batteries during remote military tactical maneuvers because currently available battery chargers are not generally portable. Currently available battery chargers also require logistical support such as a generator, military vehicle, or other equipment that would usually be available at a typical military installation, but would not be available during tactical field operations in a remote, dangerous and hostile location. Because of the unavailability of battery charging equipment in remote, dangerous, and hostile locations, our military forces typically do not take full advantage of the battery energy that would be available from a recharged battery. This practice results in the waste of millions of dollars in battery life or energy every year, and aids in the degradation of rechargeable batteries.

Not only does the military user refrain from recharging the battery because of field conditions, the troops tend to carry multiple spare batteries to ensure that their communications and other equipment are constantly available. Although redundant spare batteries by themselves are not excessively heavy, carrying redundant spare batteries on field maneuvers along with other required equipment can create a difficult weight problem for the individual soldier in the field with a fully loaded back-pack. In those cases, the extra weight could make the soldier more susceptible to fatigue and have a detrimental impact on his survivability in remote, dangerous, and hostile locations. Another undesirable result from carrying redundant spare batteries is that the soldier may choose to discard other equipment from the fully-loaded backpack to make room for redundant spare batteries, and depending upon what equipment is left behind, e.g. extra ammunition or a signaling flare, such an omission might have a disastrous impact on the mission, and more importantly, troop survivability.

Similarly, the non-military battery user can often be in remote, dangerous, and hostile locations where the ability to charge a rechargeable battery could increase both comfort and survivability. For example, a recreational camper or boater might be lost or stranded with inoperable battery-operated communications equipment suffering from a low state of charge due to the absence of a portable battery charger for a remote location.

Thus there has been a long-felt need for a portable battery charger that will allow the soldier or recreational camper to have portable battery recharging capacity in remote, dangerous, and hostile locations that alleviates the shortcomings, limitations, and disadvantages of currently available battery charging techniques.

SUMMARY OF THE INVENTION

In order to satisfy the long-felt need for a portable battery charger that will allow the soldier or recreational user to have portable battery recharging capability in remote, dangerous, and hostile locations without the shortcomings, limitations, and disadvantages of currently available battery charging equipment, the present invention provides a portable electrochemical charger for rechargeable AA batteries. This invention's portable multi-input remote AA battery charger can recharge as many as eight (8) AA batteries at once within 100 minutes. This invention's battery charger for rechargeable batteries can also be powered by a number of the currently available military batteries such as the BA-8180, BA-8140, BA-5590, BA-5390, BB-390, BB-2590, and SP4 batteries.

It is an object of the present invention to provide a portable electrochemical charger for rechargeable AA batteries.

Another object of the present invention is to provide a portable multi-input charger for rechargeable AA batteries.

It is still another object of the present invention to provide a portable multi-input 100 minute charger for rechargeable AA batteries.

It is yet another object of the present invention to provide a method for charging AA rechargeable batteries with a portable battery charger.

These and other objects are advantageously accomplished with this invention's portable multi-input remote AA battery charger, which comprises at least two (2) battery chambers, slots for the AA batteries, a charging circuit, a housing, and a connector. In accordance with this invention, the remotely located military or civilian user can now recharge as many as eight (8) AA batteries at one time within 100 minutes. Other embodiments of this invention provide a portable multi-input remote AA battery charger apparatus and a method for charging AA rechargeable batteries with a portable battery charger.

DETAILED DESCRIPTION OF THE DRAWINGS

This invention's portable multi-input remote AA battery charger provides an innovative charging application for AA batteries and, in particular, for rechargeable AA nickel metal hydride batteries which are being used to a greater extent to power military communications and electronic equipment that has been fielded to remote, hostile, and dangerous locations without any of the disadvantages, shortcomings, and limitations of prior art battery chargers. This invention can be used by soldiers in the field or civilians who operate electrical equipment in remote locations such as recreational campers or boaters. This invention's portable multi-input remote AA battery chargers can also be powered with numerous different military portable power sources such as the BA-8180, BA-8140, BA-5590, BA-5390, BB-390, BB-2590, and SP4 batteries.

Figure 1:
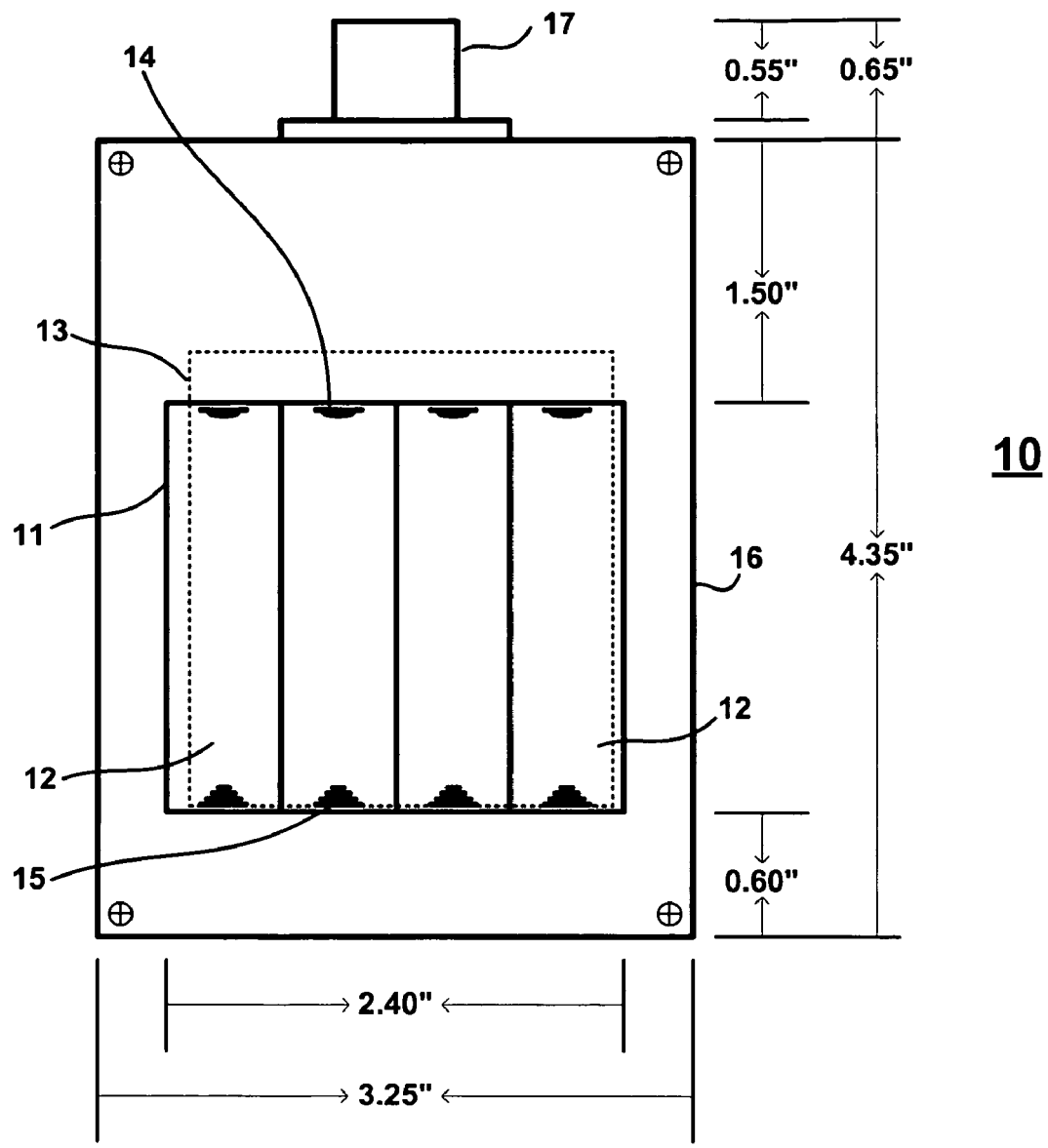
FIG. 1 is a top view of this invention's portable multi-input remote AA battery charger.

Referring now to FIG. 1, there is depicted a top view of this invention's portable multi-input remote AA battery charger 10, comprising a first battery chamber 11, first slots 12 for the AA batteries, and a first charging circuit represented by a broken line rectangle 13 positioned underneath the first battery chamber 11. The first slots 12 are dimensioned to accept AA batteries and include the necessary contact points 14 and 15. The first chamber 11, first slots 12 and first charging circuit 13 are installed in a housing 16 having a male power source connector 17 for external electrical power. Similar structures would also be found in a bottom view of this invention, which is not shown in this drawing. FIG. 1 also includes several representative dimensions such as the first battery chamber 11 measuring 2.40" wide, the housing 16 being 3.25" wide and 4.35" long, and the power source connector 17 with a total length of 0.65." Of course, other dimensions are also possible in accordance with this invention.

Figure 2:
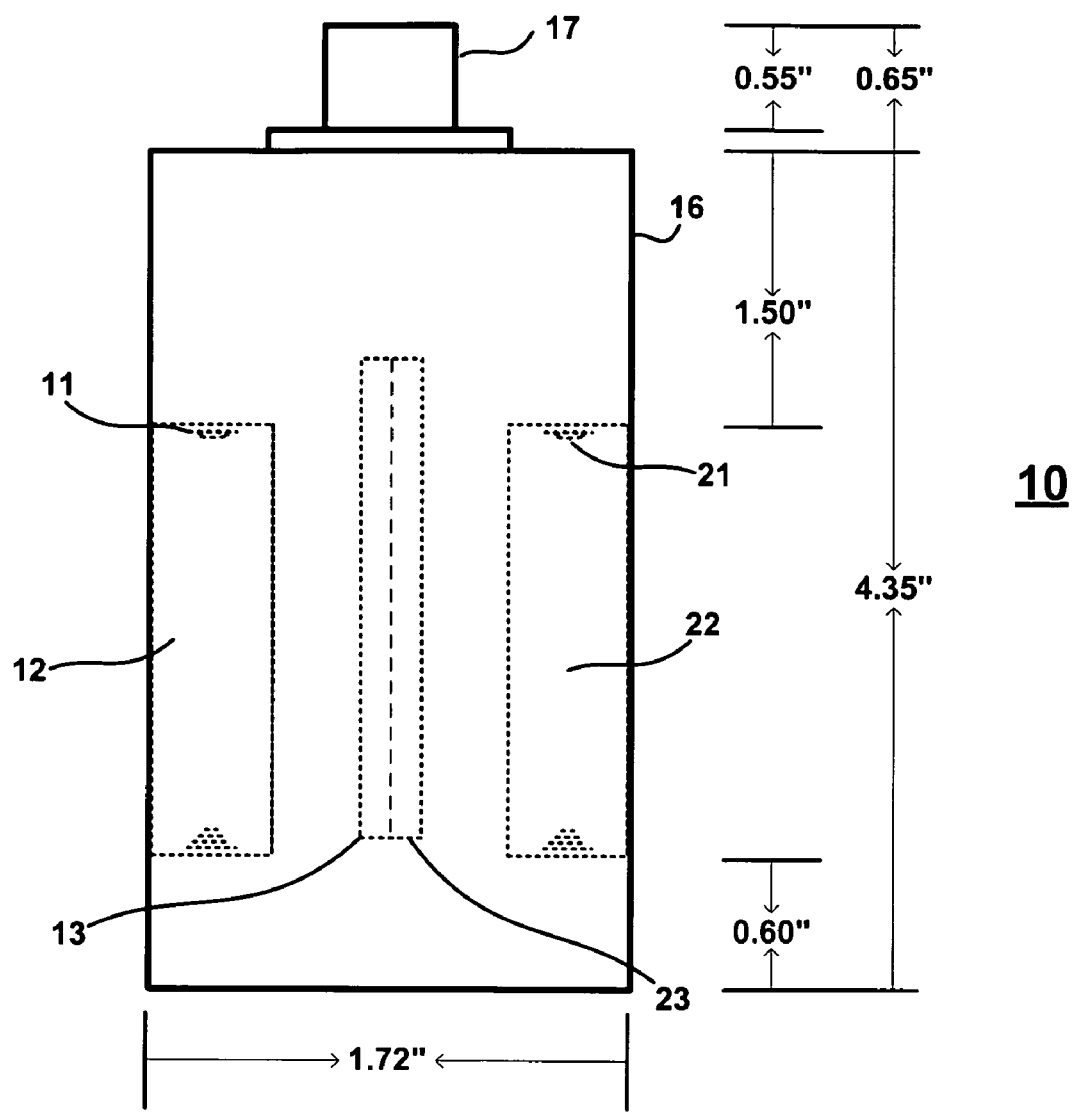
FIG. 2 is a breakaway side view of this invention's portable multi-input remote AA battery charger.

FIG. 2 is a breakaway side view of this invention's portable multi-input remote AA battery charger 10, using the same callout numerals for like structures, depicting the first battery chamber 11, a first slot 12, and a first charging circuit 13. The charger 10 also includes a second battery chamber 21, a second slot 22, and a second charging circuit represented by a broken line rectangle 23 positioned alongside the first charging circuit 13. FIG. 2 also includes several representative dimensions such as the housing 16 being 1.72" deep and having a distance of 1.50" between the first and second battery chambers 11 and 21 and the power source connector 17.

Figure 3:
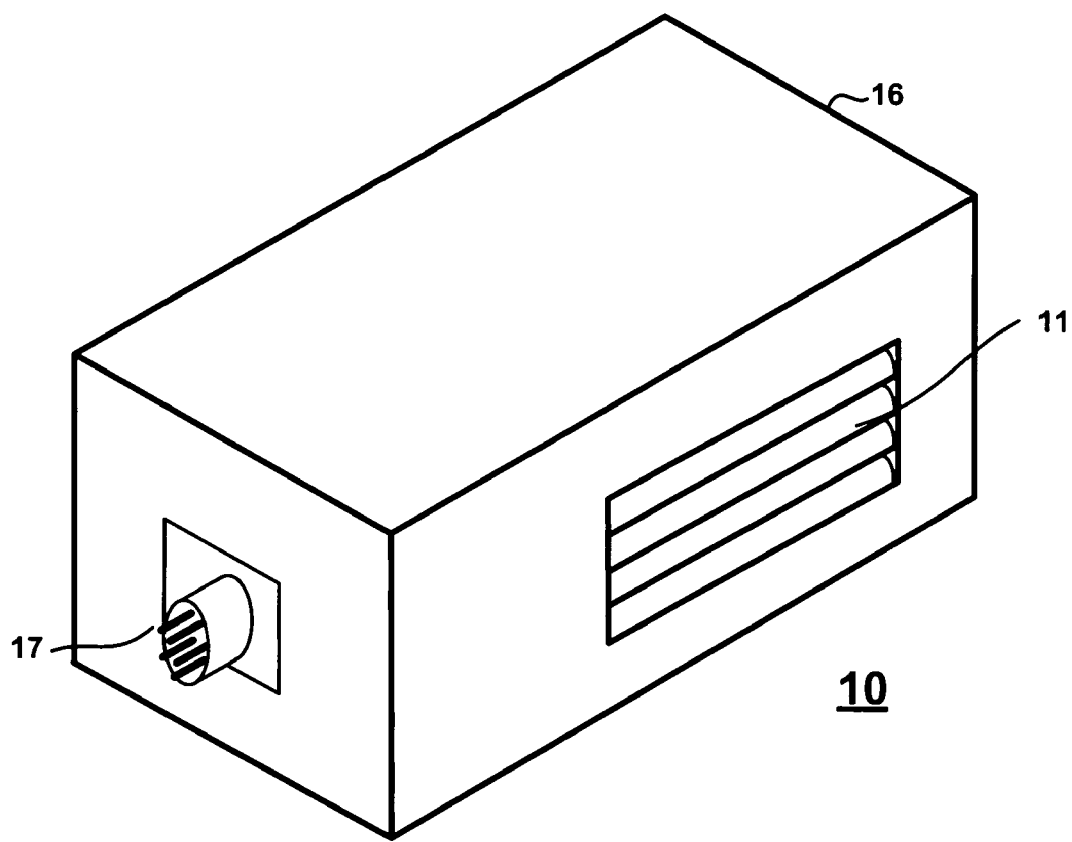
FIG. 3 is a perspective view of this invention's portable multi-input remote AA battery charger with batteries loaded in one chamber.

FIG. 3 is a perspective view this invention's portable multi-input remote AA battery charger 10 with AA batteries loaded in one of the chambers.

In operation, the present invention provides a portable 8-AA charging capability for the dismounted soldier in the field or another remote location, as well as the recreational camper or boater. The charger 10 includes a pair of charging circuits 13 and 23 that are connected to the first and second battery slots 12 and 22, respectively, all of which are enclosed in the housing 16. The charging circuits 13 and 23 can be two MAHA 100 minute charging circuit boards, or another suitable charging circuit board, and each one is connected to its respective battery slot 12 and 22. The power source connector 17 can be the military BB-2590 male bulkhead connector located on the side of the housing 16, although other suitable connectors can also be advantageously employed. The power source connector 17 is wired in parallel and independently supplies between 12-18 V to each charging circuit. The present invention also contemplates a portable multi-input remote AA battery charging apparatus with many similar elements.

Figure 4:
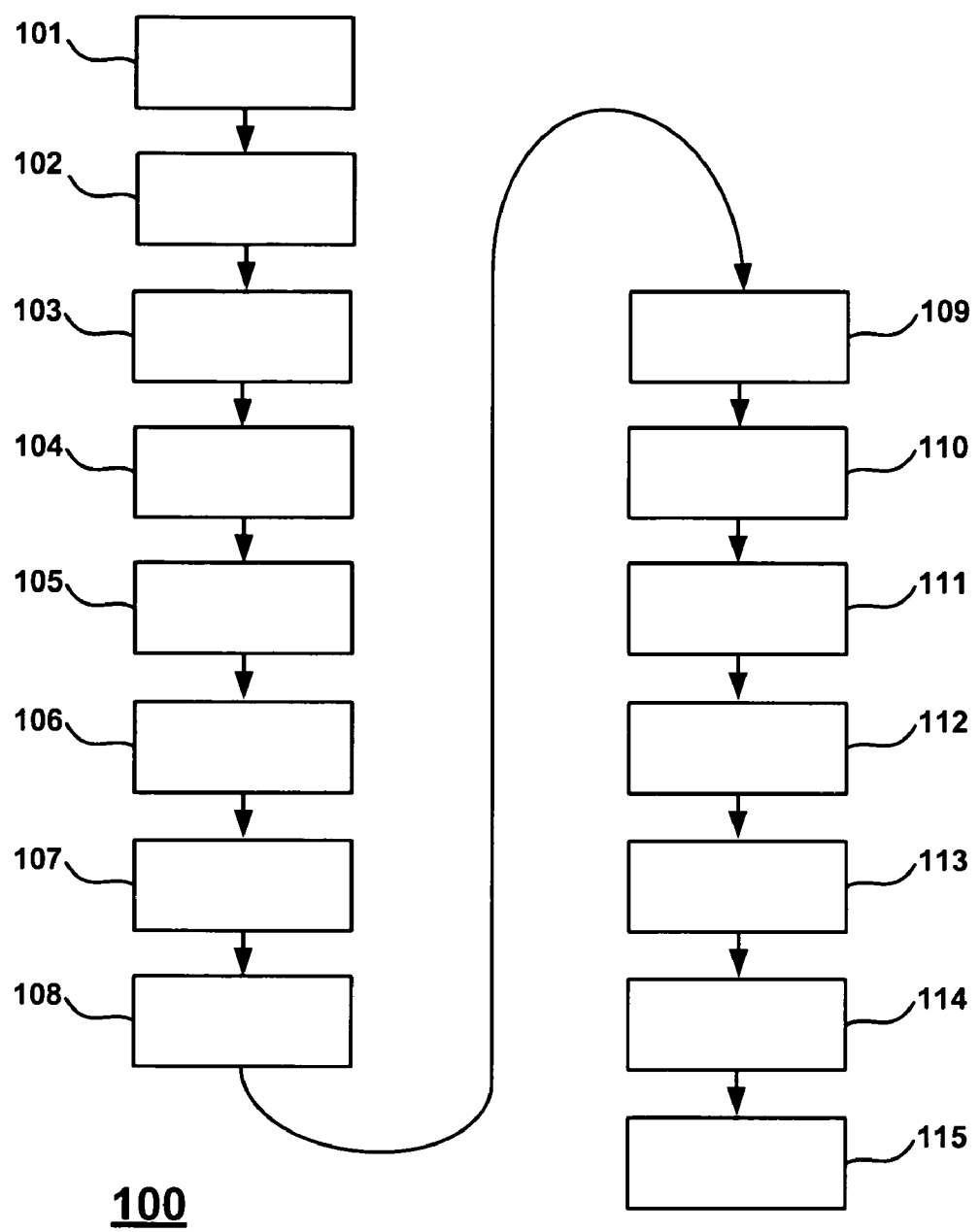
FIG. 4 is a flow diagram depicting the steps of this invention's method for charging AA rechargeable batteries with a portable battery charger.

Referring now to FIG. 4, this invention also encompasses a method for charging AA rechargeable batteries with a portable battery charger 100, comprising the steps of forming a housing 101; forming a first battery chamber and a second battery chamber 102; disposing a first plurality of battery slots within the first battery chamber 103; dimensioning the first plurality of battery slots to accept a plurality of AA rechargeable batteries 104; positioning a first charging circuit underneath the first battery chamber 105; connecting the first charging circuit to the first plurality of slots 106; and installing the first battery chamber, the first plurality of slots, and the first charging circuit in a first side of a housing 107. The steps of the method continue with the steps of disposing a second plurality of battery slots within the second battery chamber 108; dimensioning the second plurality of battery slots to accept the plurality of AA rechargeable batteries 109; positioning a second charging circuit underneath the second battery chamber 110; installing the second battery chamber, the second plurality of battery slots, and the second charging circuit in a second side of the housing 111; connecting the second charging circuit to the second plurality of battery slots 112; forming a male power source connector on the housing 113; providing an electrical recharging input from the male power source connector to the first charging circuit and the second charging circuit 114; and rapidly recharging the plurality of AA rechargeable batteries 115. Many of the variations of the device and apparatus embodiments also apply to the method of this invention.

These embodiments of the present invention are intended to be illustrative and not limiting with respect to the variety of possible embodiments. It is to be further understood that other features and modifications to the foregoing detailed description of the devices, apparatus, systems and methods are all considered to be within the contemplation of the present invention, which is not limited by this detailed description. Those skilled in the art will readily appreciate that any number of configurations of the present invention and numerous modifications and combinations of materials, components, geometrical arrangements and dimensions can achieve the results described herein, without departing from the spirit and scope of this invention. Accordingly, the present invention should not be limited by the foregoing description, but only by the appended claims.

What we claim is:

1. A portable multi-input remote AA battery charger, comprising:
   a first battery chamber;
   a first plurality of battery slots disposed within said first battery chamber;
   a first charging circuit positioned underneath said first battery chamber;
   said first plurality of battery slots being dimensioned to accept a plurality of AA rechargeable batteries;
   said first charging circuit being connected to said first plurality of slots;
   said first battery chamber, said first plurality of slots, and said first charging circuit being installed in a first side of a housing;
   a second battery chamber, a second plurality of battery slots, and a second charging circuit being installed in a second side of said housing, said second charging circuit being connected to said second plurality of battery slots;
   said housing having a male power source connector; and
   said male power source connector provides an electrical recharging input to said first charging circuit and said second charging circuit causing said plurality of AA rechargeable batteries to be rapidly recharged.

2. The portable multi-input remote AA battery charger, as recited in claim 1, further comprising said first charging circuit and said second charging circuit being positioned in proximity to one another.

3. The portable multi-input remote AA battery charger, as recited in claim 2, further comprising recharging said plurality of AA rechargeable batteries within 100 minutes.

4. The portable multi-input remote AA battery charger, as recited in claim 3, further comprising said electrical charging input coming from another battery.

5. The portable multi-input remote AA battery charger, as recited in claim 4, further comprising said another battery being a military battery.

6. The portable multi-input remote AA battery charger, as recited in claim 5, further comprising said plurality of AA rechargeable batteries being rechargeable nickel metal hydride AA batteries.

7. A portable multi-input remote AA battery charging apparatus, comprising:
- a first battery chamber;
- a first plurality of battery slots disposed within said first battery chamber;
- a first charging circuit positioned underneath said first battery chamber;
- said first plurality of battery slots being dimensioned to accept a plurality of AA rechargeable batteries;
- said first charging circuit being connected to said first plurality of slots;
- said first battery chamber, said first plurality of slots, and said first charging circuit being installed in a first side of a housing;
- a second battery chamber, a second plurality of battery slots, and a second charging circuit being installed in a second side of said housing, said second charging circuit being connected to said second plurality of battery slots;
- said first plurality of battery slots and said second plurality of battery slots having a plurality of contact points;
- said housing having a male power source connector;
- said first charging circuit and said second charging circuit being located in proximity to one another; and
- said male power source connector provides an electrical recharging input from another battery to said first charging circuit and said second charging circuit causing said plurality of AA rechargeable batteries to be rapidly recharged within 100 minutes.

8. The portable multi-input remote AA battery charging apparatus, as recited in claim 7, further comprising said first charging circuit and said second charging circuit being positioned adjacent to one another.

9. The portable multi-input remote AA battery charging apparatus, as recited in claim 8, further comprising said another battery selected from the group of military batteries consisting of the BA-8180, BA-8140, BA-5590, BA-5390, BB-390, BB-2590, and SP4 military batteries.

10. The portable multi-input remote AA battery charger, as recited in claim 9, further comprising each of said plurality of battery slots being dimensioned to accept four AA batteries.

11. The portable multi-input remote AA battery charging apparatus, as recited in claim 10, further comprising said plurality of AA rechargeable batteries being rechargeable nickel metal hydride AA batteries.

12. The portable multi-input remote AA battery charger, as recited in claim 11, further comprising said first and second charging circuits being MAHA charging circuit boards.

13. A method for charging AA rechargeable batteries with a portable multi-input remote AA battery charger, comprising the steps of:
- forming a housing;
- forming a first battery chamber and a second battery chamber;
- disposing a first plurality of battery slots within said first battery chamber;
- dimensioning said first plurality of battery slots to accept a plurality of AA rechargeable batteries;
- positioning a first charging circuit underneath said first battery chamber;
- connecting said first charging circuit to said first plurality of slots;
- installing said first battery chamber, said first plurality of slots, and said first charging circuit in a first side of a housing;
- disposing a second plurality of battery slots within said second battery chamber;
- dimensioning said second plurality of battery slots to accept said plurality of AA rechargeable batteries;
- positioning a second charging circuit underneath said second battery chamber;
- installing said second battery chamber, said second plurality of battery slots, and said second charging circuit in a second side of said housing, said second charging circuit being connected to said second plurality of battery slots;
- connecting the second charging circuit being to the second plurality of battery slots;
- connecting a male power source connector to said housing;
- providing an electrical recharging input from said male power source connector to said first charging circuit and said second charging circuit; and
- rapidly recharging said plurality of AA rechargeable batteries.

14. The method for charging AA rechargeable batteries with the portable multi-input remote AA battery charger, as recited in claim 13, further comprising the step of aligning said first charging circuit and said second charging circuit in proximity to one another.

15. The method for charging AA rechargeable batteries with the portable multi-input remote AA battery charger, as recited in claim 14, further comprising the step of rapidly recharging said plurality of AA rechargeable batteries within 100 minutes.

16. The method for charging AA rechargeable batteries with the portable multi-input remote AA battery charger, as recited in claim 15, further comprising the step of providing said electrical charging input from another battery.

17. The method for charging AA rechargeable batteries with the portable multi-input remote AA battery charger, as recited in claim 16, further comprising the step of selecting said another battery from the group consisting of the BA-8180, BA-8140, BA-5590, BA-5390, BB-390, BB-2590, and SP4 military batteries.

18. The method for charging AA rechargeable batteries with the portable multi-input remote AA battery charger, as recited in claim 15, wherein said plurality of AA rechargeable batteries are a plurality of nickel metal hydride AA batteries.

* * * * *